Y. NODA.
FLOWER STAND.
APPLICATION FILED APR. 20, 1921.
1,431,679.
Patented Oct. 10, 1922.
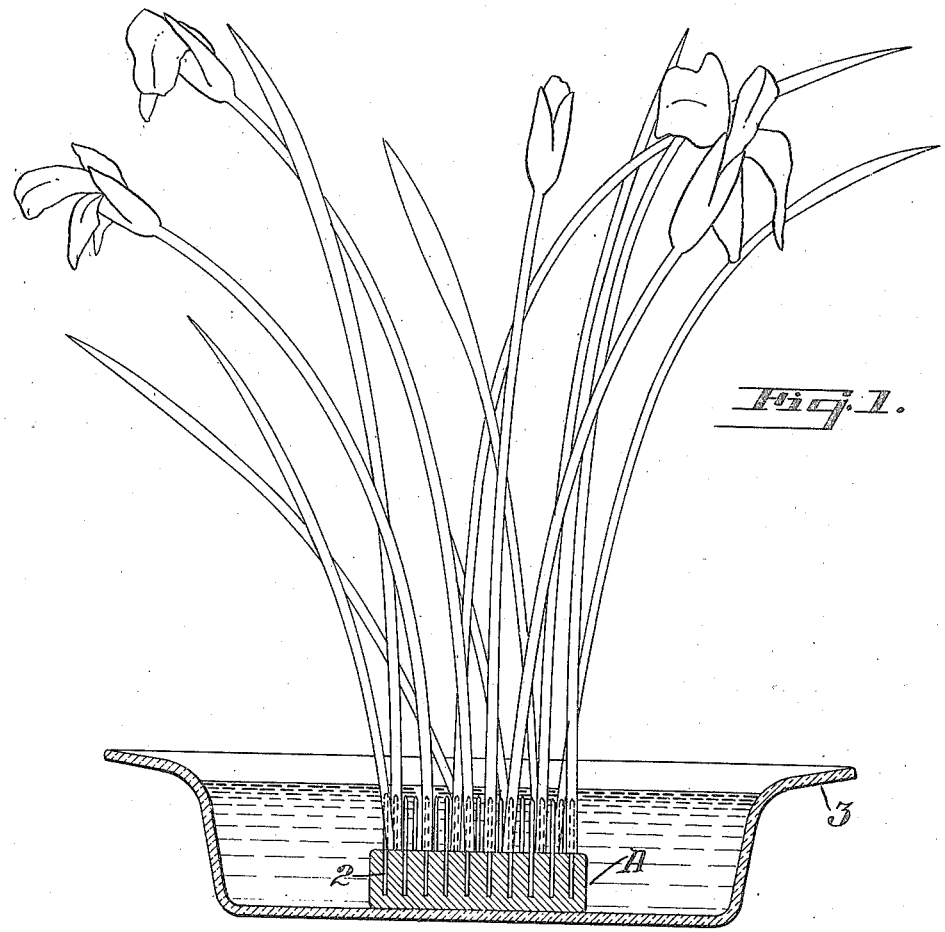
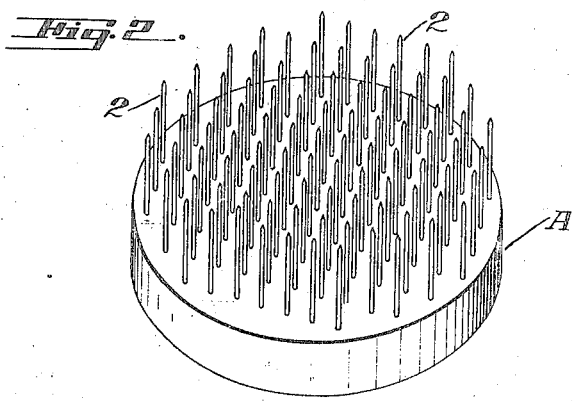
INVENTOR
YUKICHI NODA.
BY Chas. E. Townsend
ATTORNEY.

Patented Oct. 10, 1922.

1,431,679

UNITED STATES PATENT OFFICE.

YUKICHI NODA, OF SAN FRANCISCO, CALIFORNIA.

FLOWER STAND.

Application filed April 20, 1921. Serial No. 462,880.

*To all whom it may concern:*

Be it known that I, YUKICHI NODA, citizen of the United States, residing at San Francisco, in the county of San Francisco and State of California, have invented new and useful Improvements in Flower Stands, of which the following is a specification.

This invention relates to a means for supporting the stems of flowers and the like in a more or less upright or divergent position, and particularly to open or spread the stems so as to admit water more freely, and thus extend the life and freshness of cut flowers, when exposed in a flower stand.

The invention consists of a stand or base having a great number of upwardly extending points or pins, upon which the pulpy ends of the stems of lilies or flowers are telescoped or impaled, thus expanding the stems for the free admission of water by which the life of cut flowers used for ornamentation may be increased. This base is submerged in an exterior vase which contains water, the pins being preferably submerged so that the ends of the stems will be beneath the surface, and freely absorb the water.

These supporting pins also serve to spread and diverge the stems, so that the flower heads may be widely separated and extended over a considerable space which will greatly increase their effective display.

The invention will be further explained by reference to the accompanying drawings, in which:

Fig. 1 shows the base in an inclosing water receptacle and flowers supported on the pins and spread out.

Fig. 2 is a view of the base with its pins.

In the illustration, A is the base of the stand which may be of any shape or material. It is here shown in the form of a short cylinder and is provided with a great number of upwardly projecting points or pins 2 closely disposed and pointed so that the lower ends of flower stems may be telescoped vertically or impaled diagonally upon the pins, and thus support the flowers. Many flowers such as lilies, have stems of considerable size, and the interior of such stems are composed of a pulpy or foraminous substance through which water may percolate and ascend. When such flowers are displayed in devices in which the stems are inclosed in circular or tubular holders, this pulpy interior is compressed and water is prevented from ascending which causes the flowers to wither and die. In this device the base and points are submerged just beneath the surface of water which may be contained in an outer vase or holder 3 as shown. The stems may be telescoped vertically or impaled diagonally upon the pins and the pins will separate and loosen up the pulpy interior body so that it will admit water more freely, to ascend the body of the stem and ensure the freshness and longer life of the flowers.

Having thus described my invention, as now known to me, it will be understood that various changes might be made in the combination, construction and arrangement of parts by those skilled in the art, without departing from the spirit of the invention, as claimed.

Having thus described my invention, what I claim and desire to secure by Letters Patent, is:

1. A flower stand and support consisting of a base, having upwardly projecting pins upon which the lower ends of the flower stems are impaled.

2. A flower supporting stand comprising a base member having interspaced vertically disposed projecting pins secured in its upper face upon which the lower ends of the flower stems are adapted to be telescoped or impaled and the interior body of the stem perforated or separated, and a container or vase for the reception of water in which the base member and pins and the lower ends of the flower stems are adapted to be submerged.

YUKICHI NODA.